Jan. 23, 1934.  P. MEYER  1,944,360
ARTICLE FEEDING AND POSITIONING MACHINE
Filed Aug. 31, 1929  7 Sheets-Sheet 1
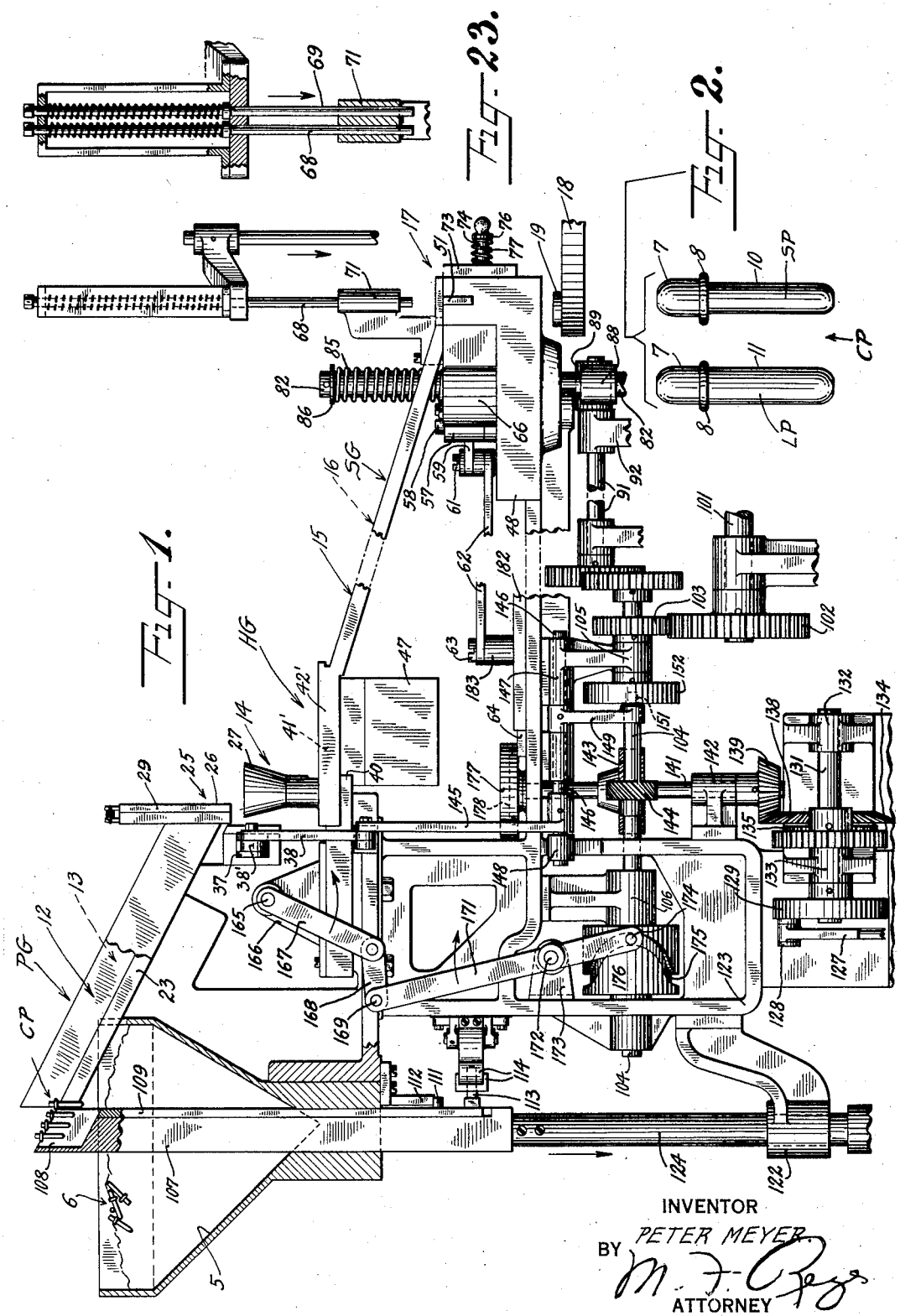
INVENTOR
PETER MEYER
BY
ATTORNEY Jan. 23, 1934. P. MEYER 1,944,360
ARTICLE FEEDING AND POSITIONING MACHINE
Filed Aug. 31, 1929 7 Sheets-Sheet 2
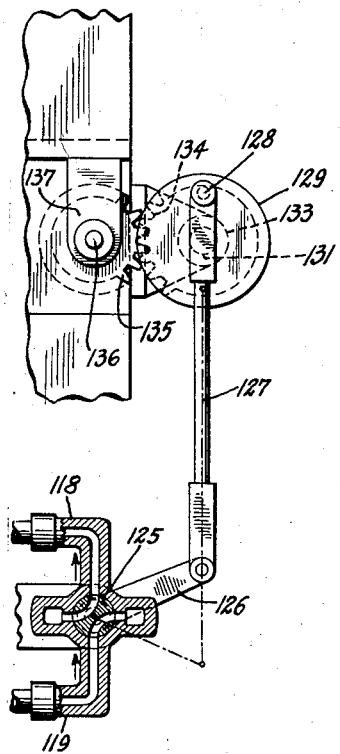
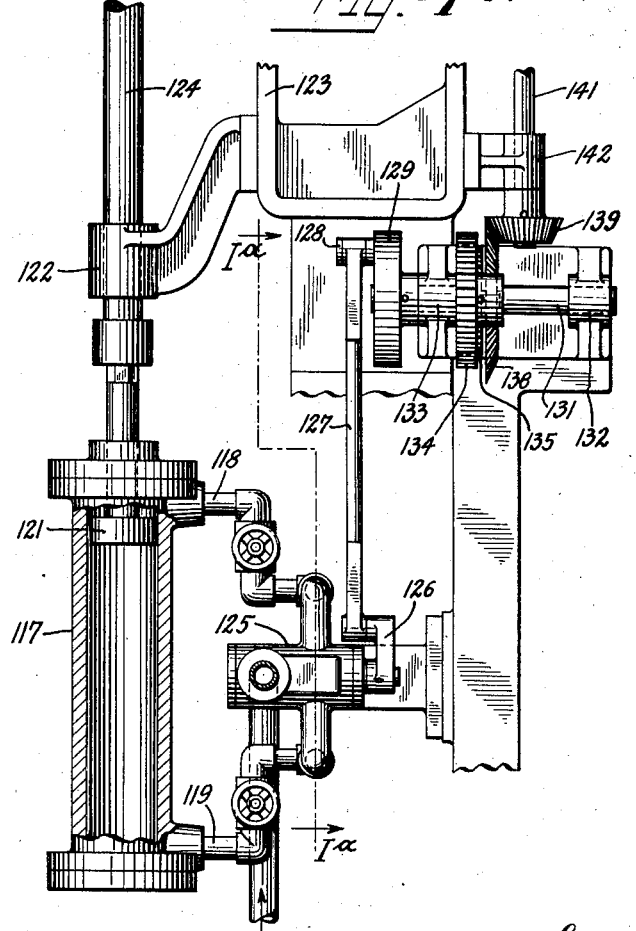
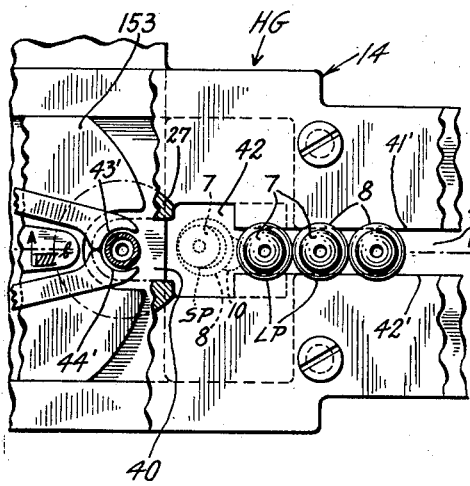
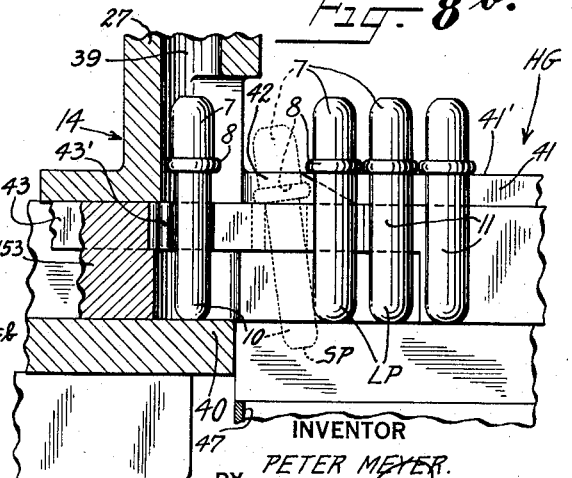

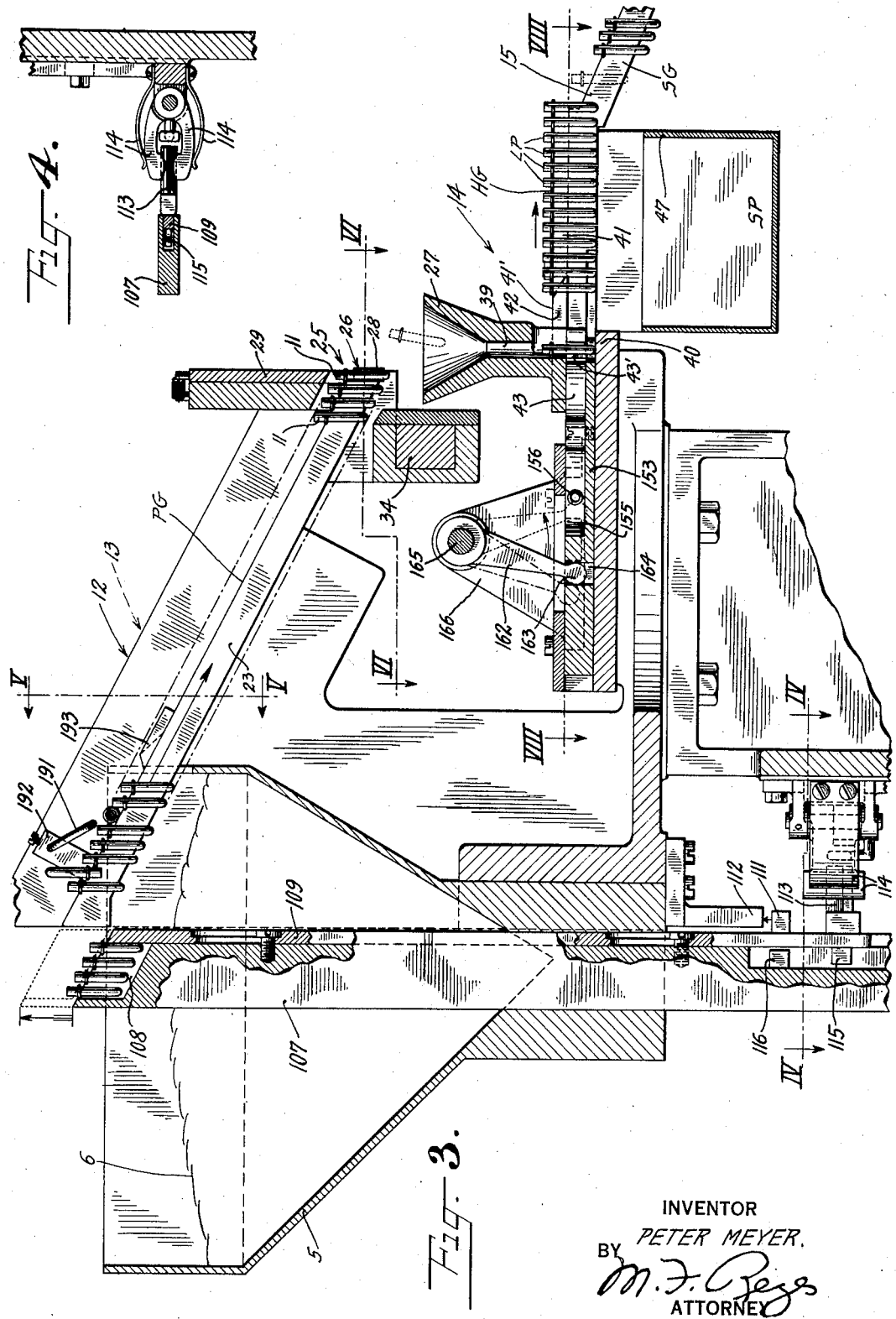

Jan. 23, 1934.　　　　　P. MEYER　　　　　1,944,360
ARTICLE FEEDING AND POSITIONING MACHINE
Filed Aug. 31, 1929　　　7 Sheets-Sheet 4

INVENTOR
PETER MEYER.
BY
ATTORNEY

Jan. 23, 1934.  P. MEYER  1,944,360
ARTICLE FEEDING AND POSITIONING MACHINE
Filed Aug. 31, 1929  7 Sheets-Sheet 5
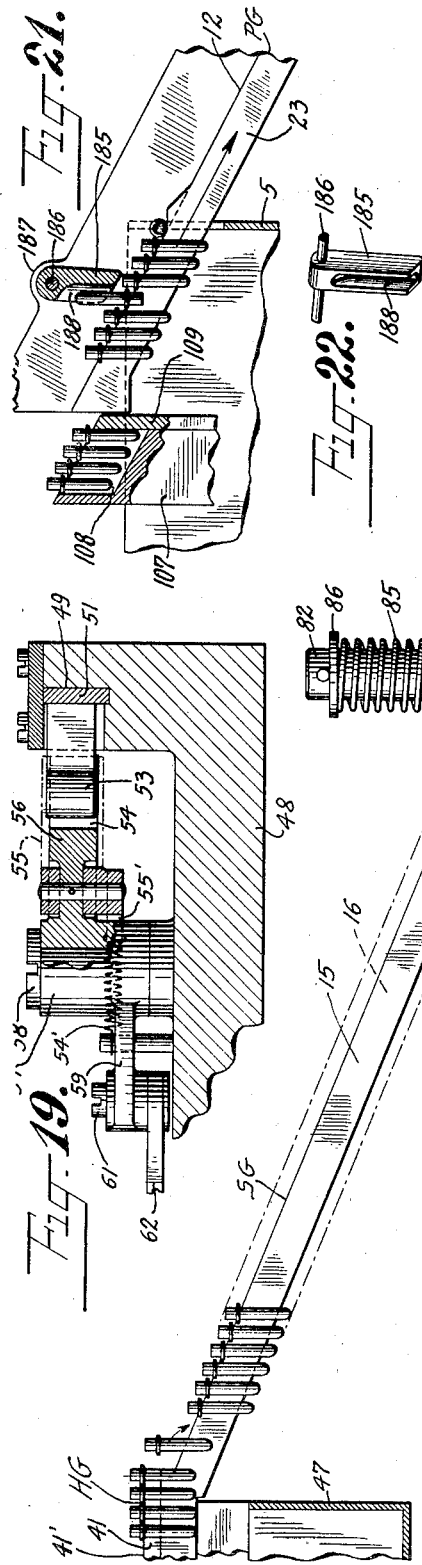
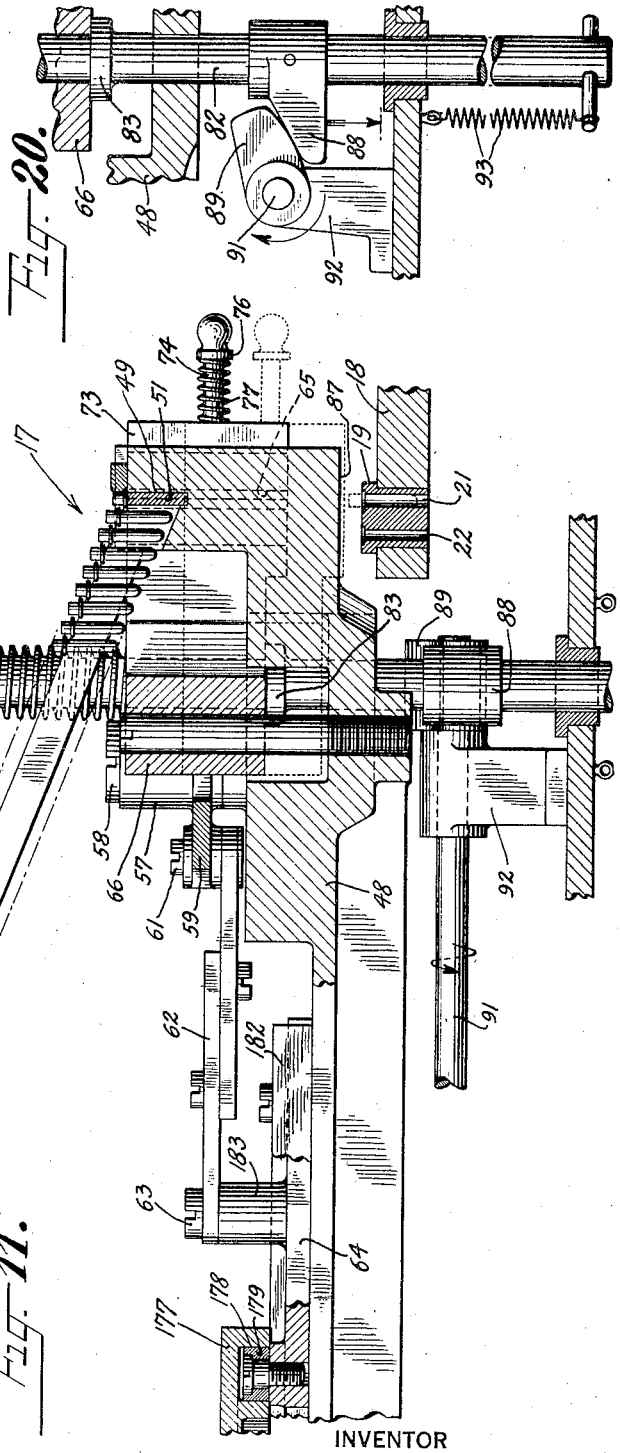
INVENTOR
PETER MEYER.
BY
ATTORNEY Jan. 23, 1934. P. MEYER 1,944,360
ARTICLE FEEDING AND POSITIONING MACHINE
Filed Aug. 31, 1929 7 Sheets-Sheet 6

INVENTOR
PETER MEYER
BY
ATTORNEY

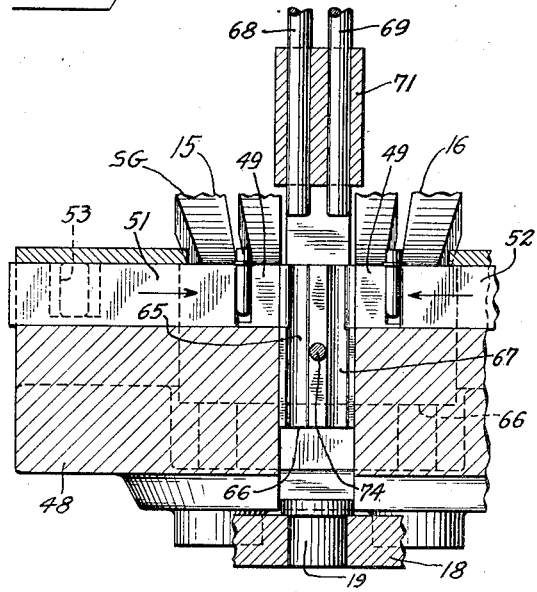
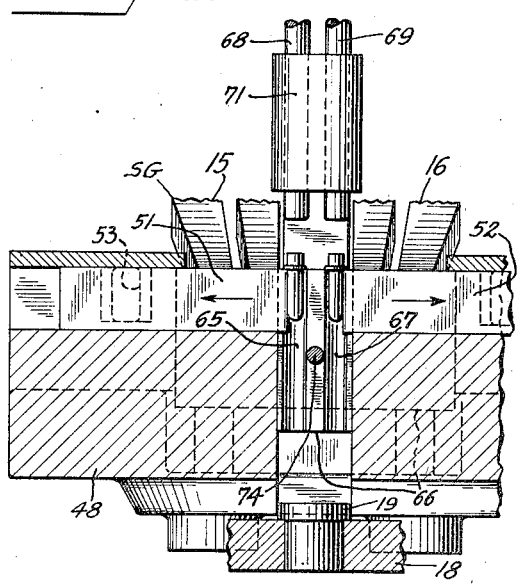
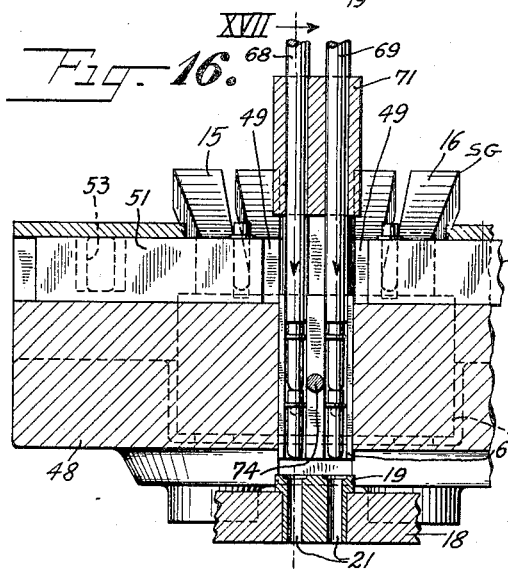
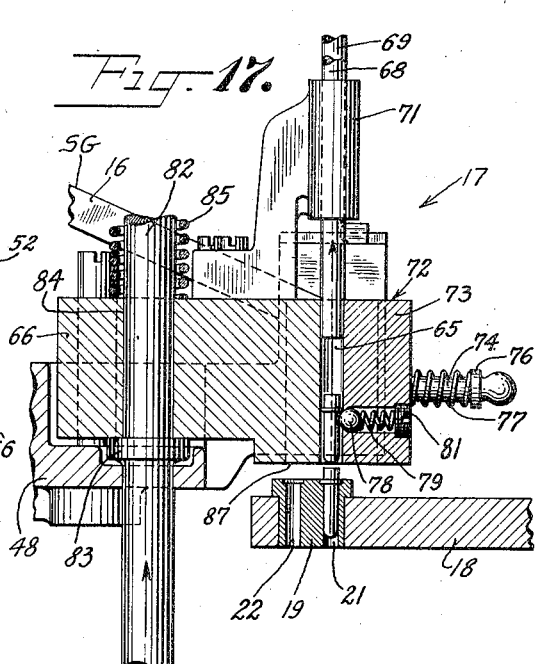
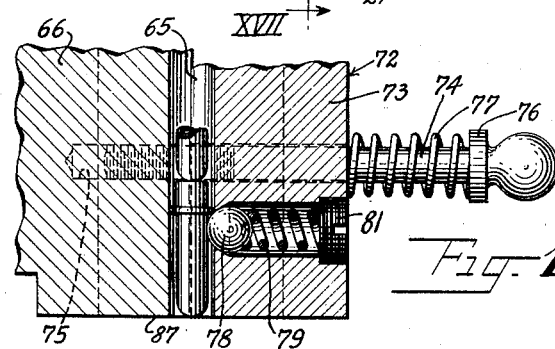

Patented Jan. 23, 1934

1,944,360

UNITED STATES PATENT OFFICE 1,944,360

ARTICLE FEEDING AND POSITIONING MACHINE

Peter Meyer, Newark, N. J., assignor to Westinghouse Lamp Company, a corporation of Pennsylvania Application August 31, 1929. Serial No. 389,842

15 Claims. (Cl. 218—2.1)

This invention relates to the manufacture of bases for vacuum electric devices and relates more particularly to mechanism for feeding and positioning metallic contact elements for attachment to such bases.

In the manufacture of electrical devices which employ a number of electrodes enclosed in a sealed glass envelope or container, the container is usually provided with a base. This base is generally made from an insulating material such as a condensate product and is usually in the form of a cap secured to the neck of the container or bulb by a cementitious material.

The production of a radio tube base includes the operation of securing a plurality of tubular metallic contact elements to the bottom of the base. The contact elements are secured to the bottom wall of the base in given spaced relation and project perpendicularly therefrom and the lead wires or conductors extending from the elements within the tube pass through the contact and are secured thereto by solder or otherwise.

It has become the custom to provide a radio tube base with contact pins of different sizes and in a particular spaced relation so as to accommodate sockets which have become standard. Contact elements have heretofore been secured in bases in various ways as for example, by molding or by a staking or riveting operation and it is necessary to provide mechanism for automatically feeding and positioning the elements for attachment to bases.

The present invention, although adapted for feeding tubular members to position for any purpose desired, is more particularly concerned with positioning of such contact elements for attachment to bases by a riveting or staking operation.

A machine for performing the operation of securing pins to bases by riveting is shown and described in Patent No. 1,783,706 issued December 2, 1930 to J. E. Ferguson and assigned to the assignee of the present invention. In the said copending application the present feeding mechanism is shown generally, whereas in the present application such feeding mechanism is more completely set forth and more completely illustrated and described.

An object of the present invention is to provide a simple and effective mechanism for automatically handling relatively short tubular sections.

Another object of the invention is to provide a mechanism for automatically feeding relatively short tubular sections of different sizes, so as to position sections of one size and discard sections of another size.

Other objects and advantages of the invention will be understood by reference to the following description together with the accompanying drawings in which, Fig. 1 is a side elevational view partly in section showing a pin feeding mechanism constructed in accordance with the present invention.

Fig. 1a is a fragmentary detail view partly in section showing mechanism for actuating a valve for operating a carrier for a feed hopper.

Fig. 1b is a detailed view partly in section showing pneumatic mechanism for operating a pin carrier for pin feed hopper.

Fig. 2 illustrates a pair of tubular sections shaped in the form of contact pins, two sides of the pins being shown in the drawings.

Fig. 3 is an enlarged vertical sectional view of the upper portion of the pin feeding mechanism.

Fig. 4 is a view taken on line IV—IV in Fig. 3.

Fig. 8a is a diagrammatic view of a portion of a guide slot showing an enlargement permitting a removal of small size pins.

Fig. 8b is a diagrammatic view showing a pin ready to drop through an enlargement in the guide slot.

Fig. 11 is an enlarged view of the lower portion of the pin feeding mechanism shown in Fig. 1 partly in section.

Fig. 14 is a view taken on line XIV—XIV in Fig. 13.

Fig. 15 is a view similar to Fig. 14 but showing pins in position to be moved downwardly for positioning on a conveyor.

Fig. 16 is a view similar to Fig. 15 showing plungers engaging the pins to move them to position on a conveyor.

Fig. 17 is a view taken on line XVII—XVII in Fig. 16.

Fig. 18 is an enlarged detail view of a portion of the mechanism shown in Fig. 17 illustrating a stop member for retarding movement of the pins.

Fig. 19 is a view taken on line XIX—XIX in Fig. 12.

Fig. 20 is a detail view of a lifter member with operating cam therefor.

Fig. 21 is a fragmentary view showing a portion of the feeding mechanism trap with a modified form of a movable ejector detent member for discarding improperly positioned pins.

Fig. 22 is a perspective view of the movable detent members shown in Fig. 21, and Fig. 23 is a front view partly in section of a pair of plunger members for moving pins to position on a conveyor.

Figure 5:
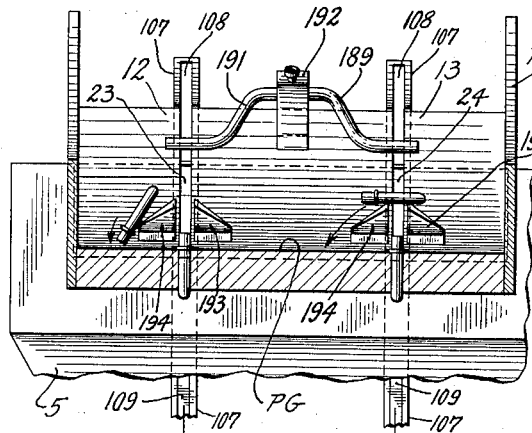
Fig. 5 is a view taken on line V—V in Fig. 3.

The present mechanism for feeding and positioning contact pins may be constructed to feed either large or small size pins. It will be understood that with the feeding of either size pins the mechanism may be similar.

For the purpose of illustrating the invention however, the structure shown is arranged to handle the large size pins. Inasmuch as it often happens that small size pins become accidently mixed with large size pins, it is necessary to provide means whereby the smaller size pins are automatically removed during the feeding of the large size pins. Mechanism, therefore, for feeding the large size pins includes all the machine elements for feeding the small size pins as well as mechanism for ejecting small size pins.

When the mechanism is constructed for feeding small size pins to the conveyor the disadvantage of having a different size pin travel down the chute is avoided since the initial guides for the small size pins are obviously so dimensioned that the large size pins will not travel down the guide and are eliminated automatically at the hopper.

It will be understood from the above that the following description taken in connection with the drawings for feeding large size pins is equally applicable to feeding of small size pins in which case the guide slots are designed of the proper dimensions.

The pin feeding mechanism as illustrated may comprise a hopper 5 for receiving a quantity of promiscuously disposed contact pins 6, a pair of primary inclined guides 12 and 13 designated as a whole by the reference character PG, gauging mechanism 14, a pair of secondary incline guides 15 and 16 designated as a whole by the reference character SG, an intermediate horizontal guide HG and pin adjusting mechanism 17. The pins as shown in Fig. 2 comprises shank portions 7 of equal dimensions as well as annular beads or shoulders 8 which are also the same diameter. The body portions 10 and 11 of the small and large pins respectively are, however, of different diameters since it is this portion of the pin which is effective in entering a socket when the device to which they are applied is completed. The pins are generally designated by the numeral as CP but when referred to separately will be indicated as LP for large pin and SP for small pin.

The above mechanisms are disposed adjacent to a conveyor 18 which may be in the form of a circular plate or disk having a plurality of bushings or inserts 19 disposed in spaced relation adjacent to the periphery of the conveyor. Each of the bushings is provided with a pair of recesses or apertures 21 to receive large pins and a pair of recesses or apertures 22 to receive small pins. The conveyor may be rotated intermittently in the usual manner (not shown) common to this class of machines. Intermittently actuated mechanisms are well known and may comprise either a Geneva movement or a cam slot and pin drive.

Figure 6:
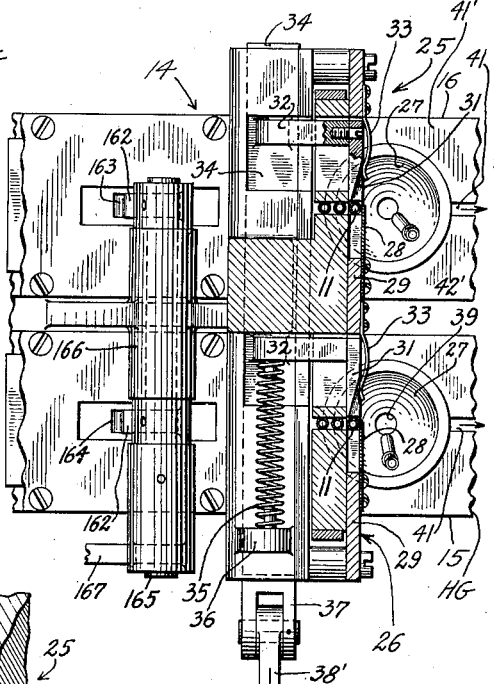
Fig. 6 is a view taken on line VI—VI in Fig. 3.
Figure 7:
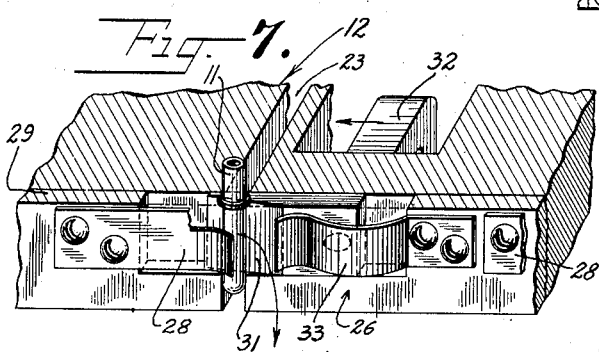
Fig. 7 is a view similar to Fig. 6 but in perspective and showing a discharge gate in a different position.
Figure 10:
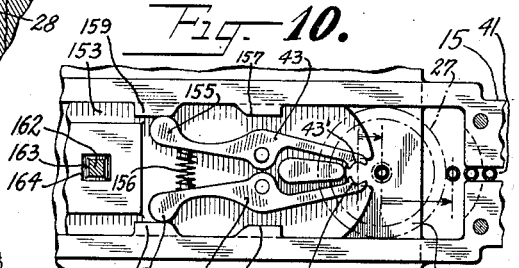
Fig. 10 is a view similar to Fig. 9 showing the jaws in a retracted position.

Pins CP when disposed in the hopper 5 are transferred to the primary incline guides 12 and 13 by means to be later described. The said primary guides are provided with guide slots 23 and 24 respectively and as the pins enter the upper ends of the guides they move or slide by gravity to the lower ends 25 (see Figs. 3, 6 and 7).

At the said lower ends of each of the guides, a stop mechanism 26 is provided so that the pins will be fed individually to a receiver 27 on the secondary guides 15 and 16. Each of the said stop mechanisms comprises a stop finger 28 in the form of a flat spring secured to a plate 29. An end of the said spring 28 projects across the path of movement of the pins 11 and normally prevents them from dropping into the receiver 27. Mechanism for individually ejecting the pins may comprise a wedge piece 31 pinned loosely to a bracket arm 32 and held in position by a tension spring 33. The bracket arm 32 is integral with a slide rod 34 and a spring 35 disposed between the arm 32 and a lug 36 which normally maintains the wedge piece 31 away from the path of movement of the pins 11.

An end 37 of the slide rod is, therefore, pivotally attached by means of a link 38' to a rocker arm 38, which arm is actuated by mechanism to be later described so as to reciprocate the slide rod 34 and move the wedge piece 31 between a pin at the end of the slot 23 and the succeeding pin so that the end pin is forced past the spring 28 and will drop into the receiver 27.

The receiver 27 is provided with a flared mouth communicating with a vertical passage 39. At this point it is necessary to provide means for separating any small pins which might have been fed with the large pins. It will be understood that the primary guides are provided with slots of such width that the shoulders of either the large or small pins prevent the pins from dropping through the guides.

It will be noted that although the shoulders of the pins CP may be of the same diameters the body portions 10 and 11 of pins LP and SP respectively as hereinbefore mentioned are of different diameters. Since the above described feed mechanism operates to feed large pins LP it is necessary to provide means for removing the small pins SP.

Figure 8:
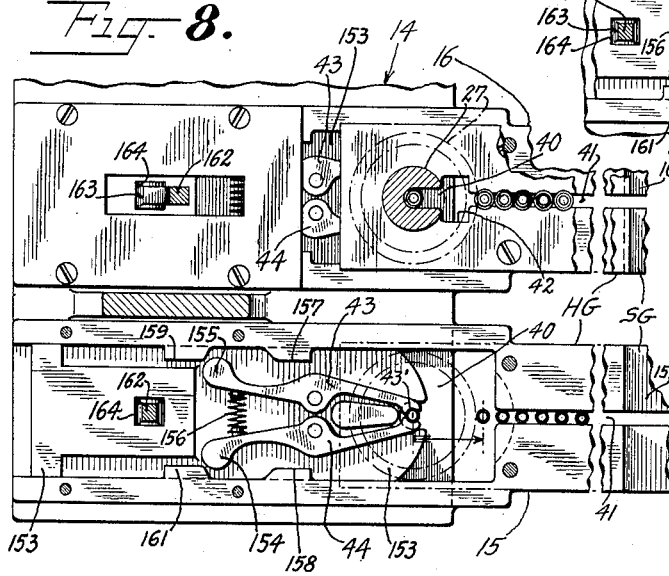
Fig. 8 is a view taken on line VIII—VIII in Fig. 3.
Figure 9:
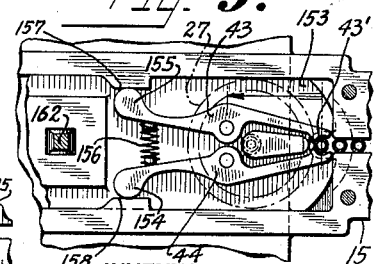
Fig. 9 is a fragmentary view showing transferring jaws illustrated in Fig. 8 the jaws being shown in position prior to movement with a pin.
Figure 12:
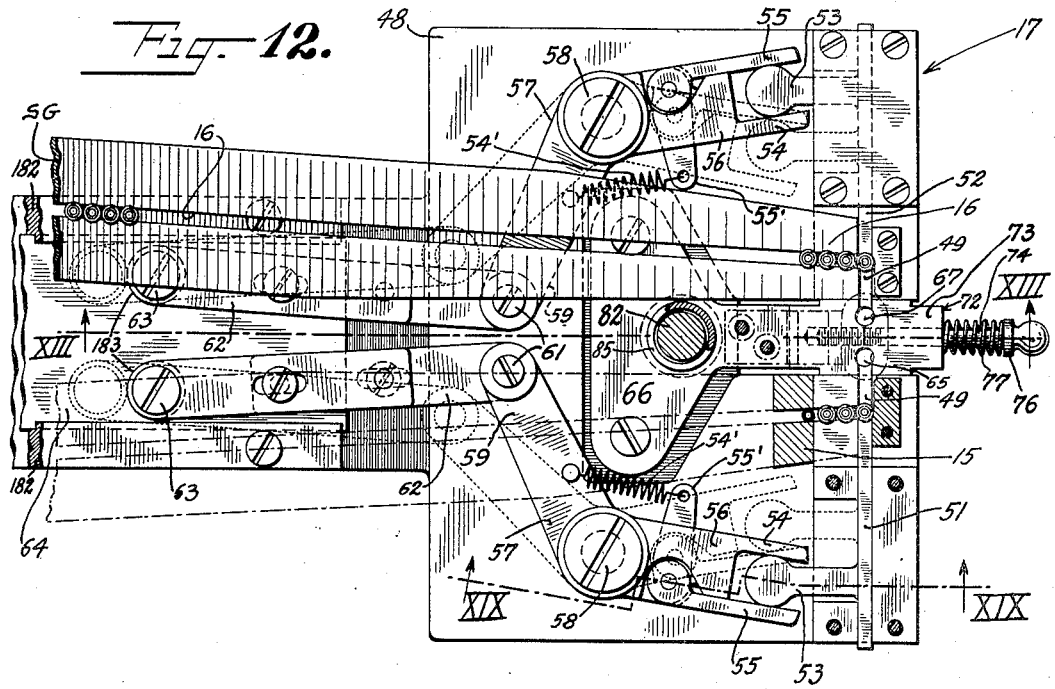
Fig. 12 is an enlarged plan view of the lower portion of the feeding mechanism shown in Fig. 11.
Figure 13:
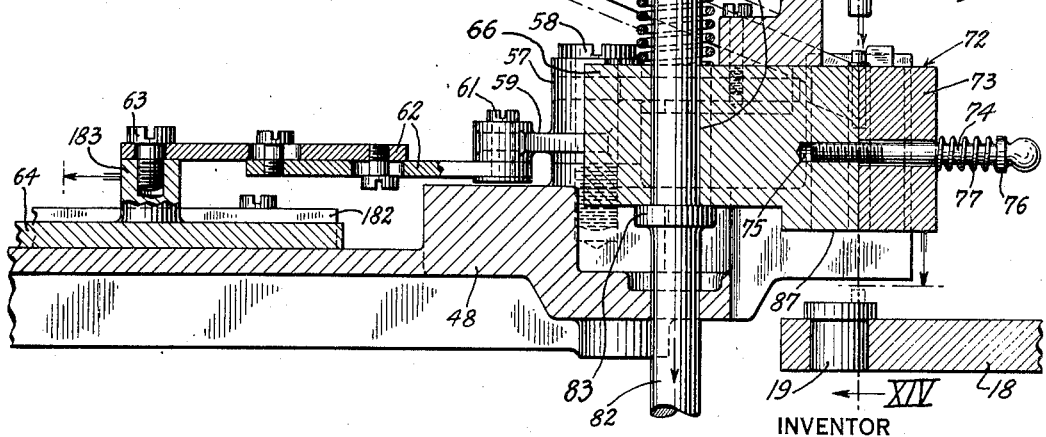
Fig. 13 is a view taken on line XIII—XIII in Fig. 12.

The pins CP drop from the receiver 27 and contact with a stop plate 40 (see Figs. 3, 8, 8$^a$, 8$^b$, 9 and 10) preparatory to movement along a slot 41 comprising guide rails 41' and 42' constituting the intermediate or horizontal guide HG connecting the primary inclined guide PG with the secondary inclined guide SG.

The guide rails 41' and 42' are so positioned as to engage the beads or shoulders 8 of the pins upon which they ride during movement along the rails for entrance to the guide SP. The guide HG is illustrated more clearly in Figs. 8$^a$ and 8$^b$.

The rails 41' and 42' constituting the guide HG extend from an aperture 42 disposed beneath the receiver 27 and over the stop plate 40. As the pins drop through the receiver and on to the stop plate 40 means in the form of a pair of advancing jaws 43 and 44 are actuated by mechanism to be presently described. These jaws are provided with gripping surfaces 43' and 44' so arranged that when the jaws are closed the gripping surfaces will grip and secure a large size contact pin LP and a movement of the jaws will carry the said large contact pin from its position on the plate 40 and engage the shoulder 8 with the edges of the rails 41' and 42'.

If the pin traveling down the receiver 27 is of small diameter the jaw surfaces 43' and 44' will not grip the pin but a movement of the jaws will serve to push the pin from engagement with the plate 40 and before the shoulder 8 reaches the rails 41' and 42' the pin will drop so that the shoulder 8 is disposed beneath the rails as the jaws 43' and 44' open for their return movement the said small diameter pin will drop into a suitable receptacle 47. It will thus be evident any pin having a body portion of less diameter than the large size pins to be handled by this mechanism will be discarded.

The jaws 43 and 44 are reciprocated so that the pins are intermittently fed forward in the slot 41 it being understood that the feeding takes place when the slot is full of pins, one pin pushing the other forward. By reason of the means for eliminating small pins, only pins of larger size will be ejected from the open end of the slot 41. The pins then drop into the secondary incline guides 15 and 16 and travel by gravity to adjuster or pin positioning mechanism 17 as shown in Figs. 11 to 19.

The pin discharge mechanism (see Fig. 12) comprises a supporting frame 48 disposed beneath the lower ends of guides 15 and 16. Pins travelling down the guides move into a tract 49 in the path of plungers 51 and 52. The plungers 51 and 52 are arranged to move across the path of travel of pins issuing from the slots of the guides and arranged to engage pins issuing from the slots. The plungers and their operating mechanism are similar and a description of one will answer for both.

Considering plunger 51, the same is provided with an extension 53 disposed between jaws 54 and 55 at the end of an arm 56 of a bell crank member 57. The bell crank member 57 is pivoted at 58 and an arm 59 thereof is pivotally connected at 61 to one end of a pull-rod 62, the opposite end of the pull rod being pivotally connected at 63 to a slide plate 64.

The slide plate 64 is reciprocated by mechanism to be presently described so that the bell crank member 57 is actuated and the push rod 51 operated to move a pin issuing from the guide 15 to position over an aperture 65 in a movable head 66 (see Figs. 14 to 17). For the purpose of preventing the application of excessive stress upon the pins and to allow for the arcuate movement of the arm 56 of the bell crank member, the jaw 55 is free to move, but is tensionally retained by a spring 54' connected to a projection 55' integral with the jaw 55 and to a stationary portion of the machine.

The said head 66 is disposed in a suitably formed recess or aperture in the frame 48 and the aperture 65 is arranged with its longitudinal axis coincident with aperture 21 in the conveyor 18.

It will be understood that a similar aperture 67 is provided in the head to receive pins moved by the push rod 52. When the pins are in position as shown in Fig. 15, plungers 68 and 69 movable in a bearing 71, move downwardly to thrust the pins through the apertures 65 and 67. The apertures 65 and 67 are divided longitudinally and are designated as a whole as split guides 72 as more clearly shown in Fig. 17.

The split guide is comprised of the head 66 and a block 73, the said block being held in position by means of a threaded rod 74 which extends through the block 73 between the guides 65 and 67 and engages a threaded aperture 75 in the head 66. The rod 74 is provided with a shoulder 76 and a spring 77 disposed between the said shoulder and the block, normally holding the block in firm operative relation with the head 66. By manipulating the rod, however, the block 73 may be loosened and in the event that a pin or pins have become jammed in the guide passages 65 and 67 they may readily be removed therefrom.

A stop member comprising a ball 78, a spring 79 and a screw block 81 is provided in the block 73. By reason of this stop the ball 74 engages a pin and prevents it from dropping through the guide slot until forced therethrough by one of the plungers 68 or 69. It is desirable to move the head 66 so that the guide passages 65 and 67 will be in position over the conveyor and over the apertures 21 so that the pins may enter the apertures 21 upon the movement of the plungers 68 and 69. For this purpose the head 66 is mounted on a carrier rod 82.

This rod is provided with a shoulder 83 which constitutes a seat for the head 66, the rod being disposed loosely in an aperture 84 in the head and extending upwardly therefrom. A helical spring 85 disposed between the head and a collar 86 on the rod serves to tensionally hold the head on the shoulder or seat 83.

A movement of the carrier rod 82 downwardly will therefore engage the lower surface 87 of the head with the conveyor but by reason of the spring 85 such contact will be tensional and avoid any excess pressure being applied to the conveyor. For the purpose of actuating the carrier rod 82 the same is provided with a contact arm 88 disposed in position for engagement with a cam 89 mounted on a shaft 91 journaled in a bearing 92. The shaft 91 is rotated by means to be presently described and upon a rotation thereof the carrier rod will be moved downwardly. A spring 93 having one end secured to the carrier rod and the opposite end secured to a stationary portion of the machine, serves to normally urge the carrier rod upwardly to normally hold the head in its raised position.

As the pins pass from the guides 15 and 16 they are moved by the plungers 51 and 52 to position over the guide passages 65 and 67 and as shown in Fig. 15 the passages become filled with pins so that with each movement of the plungers 68 and 69 a pair of pins is ejected and disposed in the apertures 21.

The foregoing general description is directed to the feeding of large pins into the apertures 21. It will be evident, however, that mechanism for feeding pins to the apertures 22 may be similar to that just described except that the guide passages 65 and 67 instead of being aligned with the apertures 21 will be in alignment with the apertures 22.

Pin feeding mechanism for large pins and pin feeding mechanism for small pins may be disposed in suitable spaced relation adjacent to the path of movement of the conveyor and may be operated simultaneously so that as a pair of large pins are inserted in apertures 21 of the conveyor a pair of small pins will be simultaneously inserted into apertures 22 of the conveyor, thus as the conveyor is moved it will carry a full set of pins ready to have bases applied thereto for further operations as set forth heretofore and more fully described in the above mentioned copending application.

The foregoing description generally sets forth various operations for feeding pins and positioning them on a conveyor. Mechanism for carrying out the operations for the above purpose may comprise a main driving shaft 101 (see Fig. 1) connected to any suitable source of power (not shown). The shaft 101 is provided with a gear wheel 102 disposed in mesh with a gear wheel 103 secured to a counter shaft 104 suitably supported in bearings 105 and 106.

The counter shaft serves to translate motion to mechanism for removing pins from the hopper 5 and disposing them in the primary guide PG.

Pin hopper mechanism

A quantity of contact pins are promiscuously disposed in the hopper 5 and means in the form of a pin lifter or carrier 107 is provided for removing pins from the hopper and applying them to the upper end of the primary guide PG. The pin carrier 107 is reciprocable vertically through the pins disposed in the hopper 5 and is provided at its upper end with a slot 108 to receive a plurality of pins, the shoulders of which rest on the edges of the slot 108 which edges are inclined at the same angle as the slot of the primary guide.

The pin carrier is movable to position adjacent the said guide so that when operative the slot at the upper end of the pin carrier constitutes a continuation of the slot in the primary guide.

As the carrier 107 is moved through a quantity of promiscuously disposed pins it picks up a plurality of pins, the body portions of which become disposed in the slot 108 at which time the lower end of the slot is closed to hold the pins in place during the upward movement of the pin carrier. For the purpose of closing the slot a guard member 109 is provided. This guard is slidably attached to the carrier and is provided with a contact member 111 adjacent to its lower end, which member upon an upward movement of the carrier 107 engages with a stop 112 so that as the carrier reaches its limited upward position the guard will be removed from the end of the slot in the pin carrier to permit the pins to slide therefrom and into the guide PG.

For the purpose of again opening the guide, the lower end thereof is provided with a projection 113 which, when the carrier is in its upward position, engages between a pair of spring clamping jaws 114. Thus upon a return movement of the carrier downwardly the jaws 114 which frictionally engage the projection 113 hold the guide from movement until it reaches its closed position, at which time a pin 115 engages a stop 116 and the projection 113 slips from between the jaws 114 as the carrier moves to its lower limited position to receive another loading of pins.

Mechanism for operating the pin carrier 107 is accomplished by pneumatic means (see Figs. 1a and 1b). This mechanism may comprise a cylinder 117 having communicating pipes 118 and 119.

Within the cylinder is a piston 121 movable in a guide bearing 122 extending from a bracket or housing 123 constituting a stationary portion of the supporting structure for the various mechanisms. The piston 121 is provided with a piston rod 124 connected with the lower end of the pin carrier 107. A reciprocable movement of the carrier is attained by means of a two way valve 125 operated by means of a lever arm 126 to alternately admit and exhaust a fluid, as air through the pipes 118 and 119 at opposite sides of the piston 121 thereby causing the same to reciprocate the carrier 107.

Mechanism for actuating the valve 125 may include a rod 127 having a crank pin 128 attached to an eccentric member 129 secured to a stub shaft 131 which shaft may be suitably mounted in bearings 132 and 133. The shaft 131 is provided with a gear wheel 134 disposed in mesh with a gear wheel 135 mounted on a parallel stub shaft 136 (see Fig. 1a) journaled in bearings 137.

The shaft 136 is provided with a beveled gear 138 disposed in mesh with a beveled gear 139 secured to one end of a vertical shaft 141 journaled in a guide bearing 142. The shaft 141 is provided with a worm wheel 143 disposed in mesh with an arm 144 secured to shaft 104.

The above description sets forth the mechanism for operating means for removing pins from the hopper 5, which mechanisms is driven through the translation of motion from the main driving shaft 101 through the agency of gears 102 and 103, counter shaft 104, worm wheel and worm 143 and 144, miter gears 138 and 139, spur gears 134 and 135 and crank 129 which actuates the valve 125 to alternately apply pressure to opposite sides of the piston 121 and thus reciprocate the pin carrier 107.

After the pins have moved down the primary incline guide PG they are applied to mechanism whereby pins of relatively small diameter are separated from pins of large diameter.

Pin separating mechanism

Mechanism for removing small diameter pins from the machine as above mentioned comprise a receiver 27 into which pins are fed individually from the lower end 25 of the primary inclined guide. As above set forth the individual pin feeding means is actuated by the rocker arm 38 (see Figs. 1, 6 and 7). An actuation of the rocker arm 38 operates the slide rod 34 to release a pin and retain the succeeding pin within the guide. Means for actuating the rocker arm 38 may include a crank member 145 secured to a shaft 146 supported in bearings 147 and 148. The shaft 146 is provided with an arm 149 having a cam follower 151 disposed in a cam slot of a cam 152 secured to the shaft 104 thus a rotation of the shaft 104 rocks the arm 149 and translates motion to the arm 38 to reciprocate the slide rod 34 for the individual deposit of pins into the receiver 27.

The pins pass through the receiver 27 and are engaged by jaws 43 and 44 above mentioned. These jaws are carried on a slide plate 153 and are provided with contact fingers 154 and 155 normally urged apart by a spring 156 so as to normally hold contact faces 43' and 44' in their closed positions. The slide plate is movable to bring the jaws to position for engaging a positioned pin and cam surfaces 157 and 158 are provided to engage the fingers 154 and 155 to open the jaws to release a pin when the slide plate moves the jaws bodily to the advance or pin releasing position.

Another set of cam surfaces 159 and 161 are provided to positively hold the jaws open to receive a pin.

The cam surfaces for engaging the fingers 154 and 155 are so positioned that as the slide plate 153 moves forward the jaws will be open at the time the contact surfaces 43' and 44' are disposed about a pin and closed as the jaws move toward the pin. Thus a pin of large size will be gripped by the jaws and by reason of the formation of the contact surfaces a pin of small size will not be gripped but will drop between the jaws and be forced forward with the shoulder of the pin beneath the horizontal guides or rails 41' and 42'.

Mechanism for operating the slide plate 153 may comprise a rocker finger 162 having an end 163 (see Fig. 3) disposed in a slot 164 provided in the plate 153. The rocker finger may be secured to a shaft 165 mounted in a bearing 166 and having secured thereto a lever arm 167 (see Fig. 1) connected by a link 168 to one end 169 of a lever 171 pivoted at 172 in a bearing 173. An opposite end of the lever 171 is provided with a cam follower 174 disposed in a slot 175 of a barrel cam 176 secured to shaft 104.

A rotation of the shaft 104 which receives its motion from the main driving shaft 101 will therefore operate to translate motion to mechanism for actuating the pin advancing jaws 43 and 44. As the under sized pins are separated the proper size pins will move along the guide rails 41' and 42' and as a pin is advanced to the rails a pin at the end of the rails adjacent to the secondary incline guide will drop from the rails and on to the said secondary incline guide for movement downwardly to pin adjusting mechanism 17, which mechanism positions the pin on the conveyor 18.

*Pin positioning mechanism*

The pin positioning mechanism may, as shown in Figs. 1, 11, 12, 13 and 19, be actuated upon a rotation of the vertical shaft 141. The said shaft 141 is provided at its upper end with a cam member 177 having a cam slot 178 in which a cam follower 179 extending from slide plate 64 is disposed. The slide plate 64 may be movable in guides 182 and provided with a post 183 pivotally connected at 63 to one end of the pull rod 62. The pull rod 62 is pivotally connected with the bell crank member 57 (see Fig. 12). A rotation of the shaft 101 will therefore, by reason of its gear connection with the shaft 104 and the worm wheel and worm 143 and 144, vertical shaft 141 and cam member 177, actuate the bell crank member 57 to position pins in the split guide comprised of the head 66 and the block 73 at which time means, (not shown) may be actuated for reciprocating the plungers 68 and 69 to force the pins to position on the conveyor 18.

It will be understood that the plate 64 is provided with a double set of pull rods 62 as well as a duplication of the bell crank member 57 and connected mechanism so that pins may be simultaneously removed from the inclined secondary guides SG.

When feeding pins to the primary inclined guide, it may happen that the pin carrier 107 will occasionally deposit a pin in an improper position, as for example, a pin may be carried with the shank portion extending in the slot of the guide as shown in Fig. 21.

For the purpose of removing such improperly positioned pins the primary guide may be provided with a pivoted knock out member 185 which member may be secured to a pintle 186 loosely carried in bearings 187. The knock out member 185 may be provided with a notch 188 and so positioned as to engage an improperly positioned pin which, while traveling down the incline guide will engage the knock out member and be removed from the guide.

Another form of pin knock out mechanism 80 may consist of a pair of arms 189 and 191 as shown in Fig. 5 clamped in a bracket 192. These arms also serve to remove inverted pins and in the event that a pin travels down the incline guide in a transverse position as shown in Fig. 5 each guide is provided with laterally disposed inclined surfaces 193 and 194 which engage the transversely positioned pin and eject it from the guide.

From the foregoing description it will be evident that the present mechanism operates to remove promiscuously deposited pins from a hopper and apply the pins to a primary gravity guide or conveyor having its discharge end provided with means for individually depositing the pins in a receiver member for assortment according to size. From whence pins of a predetermined size are caused to travel over an intermediate or horizontal guide having its discharge end in communication from the secondary incline guide or gravity feed element which terminates another mechanism operable to remove pins individually from the said last mentioned guide, positioning pins in an alignment passage for transfer to apertures in a conveyor, means being provided for effecting a movement of the pins through the guide passages to the said apertures of the conveyor.

By reason of the present invention an effective and efficient mechanism is provided for automatically transporting and positioning pins with predetermined portions in predetermined positions for any suitable purpose, as for example, in a selected embodiment of the invention pins are positioned so that a base may be applied thereto and the shanks of the pins automatically secured to a wall of the base.

Although a preferred embodiment of the invention is shown and described herein it is to be understood that modifications may be made therein without departing from the spirit and scope of the invention as set forth in the appended claims.

What is claimed is:

1. A machine for feeding and positioning contact pins on a support comprising an inclined guide for the movement of pins with their axes vertical and substantially parallel, a second similar inclined guide, means intermediate said guides for removing pins of predetermined diameters, a horizontal guide having guide walls transverse to said inclined guides, means for individually engaging pins for movement along said horizontal guide and means for moving said pins to said support.

2. A machine for feeding and positioning contact pins on a support comprising an inclined guide for the movement of pins with their axes vertical and parallel, guide walls constituting a guide slot transverse to the end of said inclined guide, one of said walls serving as a stop for the movement of said pins along said inclined guide, means movable between said guide walls for removing pins individually from said inclined guide and means for moving pins from said horizontal guide to said support.

3. A machine for feeding contact pins, comprising gravity means for effecting a movement of a plurality of pins in single file through a given path, a conveyor for receiving pins, pin adjusting means above said conveyor, a transverse guide for the travel of pins to said adjusting means, means for individually engaging said pins for movement in said guide from said gravity means to said adjusting means, and means for releasing said pins from said adjusting means for travel to said conveyor.

4. A machine for positioning contact pins having shoulders on a support, a delivery guide having a passage divided longitudinally into relatively movable sections, means for delivering pins to said passage, tensional means for holding said sections to maintain said passage, a member movable through said passage to eject pins, the movability of said sections serving to vary the diameter of the passage to accommodate irregularities of pins, and means for engaging the shoulder of a pin immediately behind an ejected pin.

5. A machine for feeding a contact pin to position to be secured in a base of an electrical device comprising a support for a pin, an inclined guide for the movement of pins in vertical single file toward said support, means intermediate the ends of said guide for removing pins of predetermined diameters, means at the lower end of said guide for holding a pin suspended adjacent to said support and means for positioning said pin on said support.

6. A machine for feeding a contact pin to position to be secured in a base of an electrical device comprising a support for a pin, means for removing pins of predetermined diameters, an inclined guide for the movement of pins to said means, another guide for the travel of pins not removed by said means, means cooperating with said last named guide for holding a pin adjacent to said support and means for causing a movement of a pin onto said support.

7. A machine for feeding contact pins to position to be secured in the base of an electrical device comprising a support having apertures to receive pins, a plurality of inclined guides for the movement of a plurality of vertically disposed rows of pins to position adjacent to said support, means for moving said pins above said apertures and means for inserting said pins in said apertures.

8. A machine for feeding contact pins to position to be secured in bases of electrical devices comprising a support having a plurality of apertures, a plurality of guides for the movement of vertically disposed pins in a plurality of rows, means for removing pins from said guides, means for moving each of said removed pins above and in alignment with the respective apertures in said support and means for inserting said pins in said apertures.

9. A machine for feeding contact pins to position to be secured in a base of an electrical device comprising a support having apertures arranged to conform with the arrangement of pins when secured to a base and means for feeding pins into said apertures.

10. A machine for feeding contact pins to positions to be secured in a base of an electrical device comprising a supporting means for holding pins in parallel spaced relation conforming to the arrangement of the pins when secured in a base and means for positioning pins in said first mentioned means.

11. A machine for feeding contact pins to position to be secured in a base of an electrical device comprising a support having apertures arranged to conform with the arrangement of the pins when secured to a base, means for delivering pins endwise to position adjacent to said apertures, means for moving said support to position said apertures for the reception of pins and means for the delivery of pins to said apertures.

12. A machine for positioning contact pins to be secured in bases of electrical devices comprising a support with apertures arranged to conform with the arrangement of pins when secured to bases, guide passages leading to said apertures, means for moving pins into said guide passages and means for moving said pins through said guide passages and into said apertures.

13. A machine for positioning contact pins for the bases of electrical devices each pin having a tubular portion and an enlarged portion for attachment to a base for an electrical device, a support having apertures to receive said tubular portion of the pins, means engageable with said enlarged portions for delivering said pins to said support and means for inserting said tubular portion into said apertures.

14. A machine for positioning contact pins for the bases of electrical devices each pin having a tubular portion and an enlarged portion for attachment to a base of an electrical device, a support having apertures to receive said tubular portions of the pins, means engageable with said enlarged portions for guiding said pins while in vertical positions adjacent to said support, means for moving said pins above said apertures and means for inserting the tubular portions of said pins in said apertures.

15. A machine for feeding contact pins comprising a hopper for pins, an inclined guide leading from said hopper, means for moving pins from said hopper for movement along said guide, a second inclined guide, means intermediate said guides for removing pins of predetermined diameters, and means for moving pins of predetermined diameters to said second guide for movement therealong and means for discharging pins from said second guide.

PETER MEYER.